United States Patent [19]

Higginbotham et al.

[11] Patent Number: 6,017,639
[45] Date of Patent: Jan. 25, 2000

[54] VINYLIDENE DIFLUORIDE-BASED COATING COMPOSITIONS

[75] Inventors: Clark A. Higginbotham, Wylie; Ted R. Best, Plano; Patrick Douglas Ziemer, Rowlett, all of Tex.

[73] Assignee: Valspar Corporation, Minneapolis, Minn.

[21] Appl. No.: 08/956,258

[22] Filed: Oct. 22, 1997

Related U.S. Application Data

[63] Continuation-in-part of application No. 08/842,028, Apr. 23, 1997, which is a continuation-in-part of application No. 08/735,889, Oct. 23, 1996, abandoned.

[51] Int. Cl.⁷ ..................................... B32B 15/08
[52] U.S. Cl. .......................... 428/458; 428/461; 524/243; 524/310; 524/311; 524/312; 524/356; 524/513; 524/545
[58] Field of Search ..................... 428/458, 461; 524/243, 310, 311, 312, 356, 513, 545

[56] References Cited

U.S. PATENT DOCUMENTS

| | | | |
|---|---|---|---|
| 2,953,818 | 9/1960 | Bartron | 18/57 |
| 3,139,470 | 6/1964 | Prengle et al. | 264/285 |
| 4,310,596 | 1/1982 | Van Buskirk | 428/336 |
| 4,314,004 | 2/1982 | Stoneberg | 428/421 |
| 4,636,402 | 1/1987 | Vassiliou | 427/49 |
| 4,659,768 | 4/1987 | Tortorello et al. | 524/512 |
| 4,680,346 | 7/1987 | Carson et al. | 525/486 |
| 4,684,551 | 8/1987 | Vassiliou | 427/345 |
| 4,684,677 | 8/1987 | Higginbotham et al. | 523/435 |
| 4,720,405 | 1/1988 | Carson et al. | 428/410 |
| 4,795,777 | 1/1989 | Higginbotham et al. | 524/441 |
| 4,824,728 | 4/1989 | Parsons et al. | 428/421 |
| 5,035,940 | 7/1991 | Winton et al. | 428/174 |
| 5,041,287 | 8/1991 | Driggers et al. | 424/81 |
| 5,057,172 | 10/1991 | Woiceshyn | 156/148 |
| 5,130,200 | 7/1992 | Huynh-Tran | 428/414 |
| 5,338,788 | 8/1994 | Miyataka et al. | 524/197 |
| 5,366,803 | 11/1994 | Nakazawa et al. | 428/335 |
| 5,428,087 | 6/1995 | Petit et al. | 524/127 |
| 5,444,124 | 8/1995 | Schlund et al. | 525/166 |
| 5,495,654 | 3/1996 | Goodhart et al. | 29/527.4 |

FOREIGN PATENT DOCUMENTS

| | | |
|---|---|---|
| 20376/95 | 12/1995 | Australia. |
| 0634446 | 1/1995 | European Pat. Off.. |

*Primary Examiner*—Peter D. Mulcahy
*Attorney, Agent, or Firm*—Schwegan, Lundberg, Woesnner and Kluth

[57] ABSTRACT

A coating composition based on a dispersed fluoropolymer resin is provided. The composition includes a vinylidene difluoride-based polymer such as PVDF, an organic solvent and a dispersant. A method of forming a protective coating on a metal substrate with the fluoropolymer resin-based coating composition and a composite material having at least one surface coated with a vinylidene difluoride-based polymer film are also provided.

23 Claims, No Drawings

VINYLIDENE DIFLUORIDE-BASED COATING COMPOSITIONS

This is a continuation-in-part of U.S. Ser. No. 08/842,028 filed Apr. 23, 1997, which is a continuation-in-part of U.S. Ser. No. 08/735,889 filed Oct. 23, 1996, now abandoned the disclosure of which are herein incorporated by reference.

BACKGROUND OF THE INVENTION

Pigmented fluoropolymer coatings are widely used today for coating architectural panels. These coatings can provide an attractive finish which will resist fading and chalking for long periods of time. In the production of coating compositions for structural building components, such as metal building panels, there are often competing requirements which must be balanced. Good durability properties such as color retention, mar resistance and chalk resistance are required in the face of severe weather conditions as well as corrosive industrial pollutants. Good flexibility is also needed in order to facilitate fabrication of the metal without loss of the coating's adhesion.

In the coil coating area, the difficulties are exemplified with conventionally utilized PVC plastisol based coating compositions. PVC plastisols are desirable coating vehicles from the standpoint of fabrication, thick film capability, and ability to be formulated with high solids, but generally exhibit poor durability, color retention, chalk resistance and dirt resistance. As a result, compromises must often be made either in terms of ultimate film properties or workability of the coated substrate.

There is, accordingly, a continuing need for improved coatings which give excellent durability as well as allowing fabrication of the coated substrate, thick film capability, and high solids.

SUMMARY OF THE INVENTION

The present invention provides a fluoropolymer resin-based coating composition capable of forming a tough coating resistant to weathering and other forms of chemical attack. The present composition contains substantially higher fluoropolymer and/or total solids loadings than conventional PVDF coating compositions and thus minimizes environmental problems associated with the use of volatile organic solvents. The coating composition can be applied by a variety of conventional methods and after heating provides a resilient, corrosion resistant, cured film.

The coating composition includes the fluoropolymer resin dispersed in an organic solvent in the presence of a dispersant. The fluoropolymer resin typically includes a vinylidene difluoride-based polymer and, preferably, a polyvinylidene difluoride ("PVDF"). As used herein, the term "PVDF" refers to homopolymers of vinylidene difluoride. The composition generally also includes a pigment and polymeric additives designed to improved the hardness and/or adhesion of the resulting cured film, e.g., a thermoplastic acrylic polymer or a combination of a hydroxy functional polymer and a curing agent such as an aminoplast resin. Depending on the desired properties of the final cured film, the composition may include other additives such as a flatting agent to reduce gloss or an additive to improve mar resistance.

The present invention also provides a method of coating a metal substrate to provide a cured vinylidene difluoride-based polymer film on at least one surface of the substrate. The method includes applying the coating composition onto a surface of the metal substrate to form a film, e.g., by roll coating or spraying the coating composition on the substrate surface. The coated metal substrate is then heated so that the coating layer cures to form a tough, cured film which adheres to the substrate surface. The coated metal substrate is cured by heating the vinylidene difluoride-based resin film to a temperature sufficient to coalesce the fluoropolymer resin.

The present invention also provides a composite material which includes a metal substrate having at least one surface covered with a cured vinylidene difluoride-based polymer film. A primer coat is typically applied directly to the metal substrate surface and one or more coats of the present coating composition may then be applied over the primer. Alternatively, the present composition may be employed to form a protective clear coat on top of an underlying pigmented fluorocarbon polymer-based layer. The pigmented layer may be formed using a pigmented version of the present composition or a conventional pigmented fluorocarbon polymer-based composition. In either instance, the pigmented layer is typically applied over a primer coating. The cured film results from coating a substrate surface with the above-described coating compositions and heating the coated metal substrate.

DETAILED DESCRIPTION OF THE INVENTION

The present coating composition is useful for protecting a wide variety of metal substrates, such as building components formed from aluminum, hot dipped galvanized steel, and zinc-aluminum alloys on steel. The coating composition typically includes at least about 30 wt. %, preferably at least about 50 wt. % and, more preferably about 55 to about 80 wt. % total solids. For some applications, e.g., where the coating is to be applied in the form of a paste, the coating composition may include a very high proportion of total solids (e.g., up to about 90 wt. %) and fluoropolymer resin (up to about 75 wt. % based on total composition weight of a vinylidene difluoride-based polymer). Where the composition is intended to be used to form a clear coating, the polymer resins make up substantially all of the solids content of the coating and the total solids loading is typically at least about 30 wt. % and preferably about 30 to about 40 wt. %. The composition generally has the correct viscosity and solids content to permit application on the metal substrate via the desired method (e.g., spray, coil, dip, brush or slot) without further dilution. For some applications (e.g., where the composition is used to form a clear coating), it may be desirable to adjust the viscosity of the coating composition for a particular application method and equipment. The above proportions are by weight based on total weight and all ratios and proportions herein including the accompanying claims are by weight, unless otherwise stated.

The coating composition includes a fluoropolymer dispersion, i.e., a dispersion of the fluoropolymer resin particles in an organic solvent, such as a non-aromatic ketone or ester. If the resin particle size is too large, stability problems may be experienced with the dispersion. Typically, the average particle size is about 1 to about 15 micron, and preferably about 2 to about 8 micron. Generally, the present composition includes at least about 30 wt. %, preferably at least about 35 wt. % and, more preferably, about 40–50 wt. % of a vinylidene difluoride-based polymer (based on the total weight of the coating composition). The vinylidene difluoride-based polymer typically makes up at least about 70 wt. % and preferably at least about 85 wt. % of the resin solids present in the composition. In some instances, the vinylidene difluoride-based polymer may constitute as much as about 95% to 100 wt. % of the resin solids. Preferred clear versions of the present composition include about 35–45 wt. % resin solids which includes at least about 85 wt. % PVDF and at least about 5 wt. % of a thermoplastic acrylic polymer. More preferably, the clear coating compositions include about 87 to about 95 wt. % PVDF and about 5 to about 13 wt. % of the thermoplastic acrylic polymer, e.g. a copolymer of one or more lower alkyl (C1–C6 alkyl) methyacrylate esters and/or one or more lower alkyl acrylate esters.

Any of a variety of standard application methods may be used to apply the coating composition, e.g., brush, bar, slot, roll coating or spraying. The desired viscosity will vary depending upon the particular end use, desired dry film thickness and method of application of the coating. For example, where the coating composition is to be applied through a coil coating process (e.g., by reverse roll coating), the composition preferably includes at least about 50 wt. % and, more preferably, about 55 to about 80 wt. % total solids and typically has a viscosity of about 40 to about 120 seconds and preferably about 60 to about 120 seconds (#4 Ford cup @ 77° F.). Coating compositions to be applied via a coil coating process more preferably have a viscosity of about 80 to about 105 seconds (#4 Ford cup @ 77° F.) and include about 35 wt. % to about 50 wt. % of the vinylidene difluoride-based polymer (based on total composition weight). Roll coating of a composition of this type allows the formation of films having a wet film thickness of 5–10 mils and a cured dry film thickness of 2–6 mils. Where the present composition is employed as a clear top coat, the composition is typically applied at a wet film thickness of 1 to 3 mils and produces a cured dry film thickness of about 0.2 to 1.0 mils.

Where a spray application is to be utilized, pigmented versions of the present composition preferably include at least about 50 wt. % total solids and typically have a viscosity of about 25 to about 60 seconds (#2 Zahn). Where the present composition is to be used to form a clear coating, total solids contents of 35 to 45 wt. % and PVDF contents of at least about 30 wt. % are common. Such composition coatings can be used to prepare spray coatings (e.g., via electrostatic spray) having a wet film thickness of about 2 to about 4 mils and a dry film thickness of about 1.0 to about 2.0 mils. Where the composition is used to form a clear top coat, spray applications to produce coatings having a wet film thickness of about 1 to 2 mils and a dry film thickness of about 0.3 to 0.7 mils are common. In some instances, the present composition may be thinned prior to spray application with a suitable reducing solvent, e.g., xylene, butyl carbitol or a combination thereof. The particular reducing solvent employed depends upon a number of factors including line conditions and the dry film thickness ("DFT") desired or specified.

Several different film-forming fluoropolymers are useful in the present invention, such as polyvinylidene difluoride and various vinylidene difluoride copolymers. The film-forming fluoropolymer resin typically includes PVDF having a $M_w$ of about 150,000 to about 500,000. More preferably the polyvinylidene difluoride has a $M_w$ of about 350,000 to about 450,000, a $M_w/M_n$ ratio of about 3.5 to about 5.0, and/or a melting point of about 150–170° C. One example of a commercially available polyvinylidene difluoride which is particularly suitable for use in the present composition is Kynar® 500 (available from Elf Atochem, Philadelphia, Pa.).

Vinylidene difluoride copolymers including at least about 75 percent by weight, preferably 90 percent or more of vinylidene difluoride monomer units may also be employed. Examples of monomers which may be copolymerized with vinylidene difluoride include ethylene, propylene, isobutylene, styrene, vinyl chloride, vinylidene chloride, difluorochloroethylene, chlorotrifluoroethylene, tetrafluoroethylene, trifluoropropylene, hexafluoropropylene, vinyl formate, vinyl acetate, vinyl propionate, vinyl butyrate, methyl methacrylate, ethyl acrylate, acrylonitrile, methacrylonitrile, N-butoxymethyl acrylamide, alkyl acetate and isopropenyl acetate. One group of vinylidene difluoride copolymers which are particularly suitable for use in the present compositions are copolymers formed from at least about 90 wt. % vinylidene difluoride monomer units and one or more fluorinated hydrophobic monomers such as difluorochloroethylene, chlorotrifluoroethylene, tetrafluoroethylene, trifluoropropylene, and hexafluoropropylene. Copolymers of this type are referred to herein as "fluorinated hydrophobic VDF copolymers." Typically all of the monomers used to form a fluorinated hydrophobic VDF copolymer include at least one fluorine atom covalently bonded to a carbon atom of a carbon-carbon double bond.

A wide variety of organic solvents may be used to formulate the present fluoropolymer dispersions. The organic solvent typically acts as a latent solvent for the fluoropolymer; that is, the fluoropolymer is substantially insoluble and dispersed in the solvent at room temperature but becomes solvated or dissolved in the solvent when the composition is heated. The solvent generally makes up about 1.0 to about 50 wt. % and, preferably, about 25 to about 40 wt. % of the composition. Where the composition includes substantial amounts of a ketone solvent, such as isophorone, a smaller amount of an non-aromatic ester, e.g., about 5 to about 20 wt. %, may be employed as well. In one embodiment of the invention, the solvent component of the composition preferably includes a major amount of a non-aromatic ester.

In some instances, it may be preferable to choose a solvent that will not be totally volatilized under the baking conditions used to form a dry film on a substrate. In such instances, the residual solvent remaining in the dry fluoropolymer-based film can act as a plasticizer. For other applications, it may be preferable to choose a solvent that will be essentially completely volatilized under the baking conditions employed. Preferably the solvent has a boiling point of about 170° C. to about 400° C. and more preferably about 200° C. to about 350° C. In a preferred embodiment of the invention which may be used in coil coating applications, the composition has a solvent component which includes at least 50 wt. % (on total solvent basis) solvent having a boiling point between about 250° C. to about 300° C. Preferably, such compositions include about 60–80 wt. % total solids and about 35 to about 50 wt. % of the vinylidene difluoride-based polymer. High solids coating compositions of this type, which include at least about 70 wt. % and, preferably, at least about 85 wt. % (on total resin basis) of a vinylidene difluoride-based polymer such as PVDF, may be used to form coil coatings having a substantially higher thickness than achievable with conventional PVDF coatings without the formation of blisters. For example, pigmented embodiments of the present composition including a substantial fraction (on total solvent basis) of solvent having a boiling point between about 250° C. to about 300° C. allow the formation of coil coatings with a dry film thickness ("DFT") of more than two times the DFT achievable using conventional 70% PVDF coating compositions.

Conventional solvents which may be used in the present invention include glycerol esters, glycol esters, esters (e.g., butyrates) of other aliphatic polyols, phthalates, adipates, benzoates, azelates, carbonates, trimellitates, phosphates, citrates, stearates, sebacates, glutarates, oleates, alkyds, polymeric esters, epoxidized oils, epoxy tallates, amide-esters, sulfonamides, terpenes, aromatics and ketones.

Preferably, the solvent includes a non-aromatic solvent having from about 10 to about 30 carbon atoms; more preferably from about 12 to about 25 carbon atoms. Examples of suitable non-aromatic solvents include esters of aliphatic dibasic acids and di- or triesters of aliphatic polyols and monoesters of alkyleneoxy ethers. Preferably the solvent includes a diester of a branched aliphatic diol, and more preferably, a butyrate diester of a branched octanediol, such as 2,2,4-trimethyl-1,3-pentanediol diisobutyrate ("TXIB"). Other preferred solvents for use in the present invention include polyol diesters, such as triethylene glycol bis(2-ethylhexanoate) ("TEG-EH"), and esterfied ethers, e.g., esters of glycol monoethers such as propyleneglycol methyl ether acetate ("PMA" or "PM acetate") or dipropyleneglycol methyl ester acetate ("DPMA" or "DPM acetate").

Other examples of suitable solvents which may be present to some extent as part of the solvent portion of the present compositions include phthalates such as butyl benzyl phthalate and dialkyl phthalates (e.g., di(2-ethylhexyl) phthalate, dimethyl phthalate and dioctyl phthalate); aromatics such as toluene and xylenes; ketones such as isophorone; aliphatic dibasic acid esters such as dioctyl azelate, diisodecyl adipate and di(2-ethylhexyl) sebacate; phosphates such as trioctyl phosphate and 2-ethylhexyl diphenyl phosphate; epoxy plasticizers such as epoxidized soybean oil, epoxidized tall oil fatty acid 2-ethylhexyl esters, and other conventional polyester solvents commonly employed as plasticizers.

Preferably, a major amount (i.e., at least about 60 wt. %) of the solvent portion of pigmented versions of the present composition consists of one or more non-aromatic esters. The solvent fraction may include a minor amount (i.e., no more than about 30 wt. %) of a non-aromatic ketone and/or a hydroxy functional solvent such as a glycol monoether (e.g., butyl carbitol) or a half ester of an aliphatic diol (e.g., 2,2,4-trimethyl-1,3-pentanediol monoisobutyrate). More preferably, at least about 90 wt. % and, most preferably, substantially all of the solvent portion consists of one or more non-aromatic esters. One embodiment of such preferred compositions are dispersions in which at least about 95 wt. % of the solvent portion is 2,2,4-trimethyl-1,3-pentanediol diisobutyrate ("TXIB"). Other preferred compositions include a solvent component consisting essentially of TXIB, butyl carbitol acetate, PM acetate, DPM acetate or mixtures thereof.

Embodiments of the present invention intended for use as clear coatings typically include an alkyl substituted benzene, a phthalate, a glycol monoether, a glycol ester, and/or a monoester of an alkyleneoxy ether. Examples of suitable organic solvents which may be used to formulate clear versions of the present compositions include toluene, xylenes, dimethyl phthalate, propyleneglycol methyl ether acetate, dipropyleneglycol methyl ester acetate, butyl cellosolve, n-butanol, and mixtures thereof.

The present fluoropolymer resin-based compositions also include a dispersant. While not limiting the invention, it is believed that the dispersant functions to maintain the spacing between fluoropolymer particles thereby acting as a dispersing aid. It has been found that dispersants commonly used in formulating pigment dispersions are suitable for use in the present compositions. The dispersant typically contains functionality capable of being absorbed on the surface of a pigment or fluoropolymer particle. Compounds including polar groups (e.g., amino groups) on one end and a portion which is soluble in the continuous phase of the solvent (a hydrophobic tail) on the other end are suitable for use as the dispersant.

A particularly suitable class of dispersants for use in the present compositions are referred to herein as "hyperdispersants." As used herein, the term "hyperdispersant" refers to dispersant(s) which, when included in up to about 3 wt. % in a solvent-based formulation, permit preparation of stable dispersions containing at least about 90 wt. % PVDF (on a resin solids basis) at PVDF loadings of about 35 wt. % or higher. Examples of suitable hyperdispersants include fluorinated anionic dispersants and polymeric dispersants having one or more amino groups covalently bonded to the polymer. The hyperdispersants are typically employed in relatively low levels (e.g., 0.01–0.5 wt. %) in formulations containing about 25 to about 35 wt. % PVDF. When the formulation includes greater than about 40 wt. % PVDF, about 0.1 to about 3.0 wt. % hyperdispersant is generally employed.

The dispersant may contain one or more amino groups covalently bonded to a polymer backbone or to pendant side chains of a polymer. Examples of suitable polymeric dispersants include oxyalkylated amines and polymeric polyester/polyamine condensates. Suitable oxyalkylated amines include oxyalkylated amino alcohols, such as Solsperse® 20000 (available from Zeneca, Inc.) and oxyalkylated alkyl amines such as Tetronic® 150R1 (available from BASF). Tetronic® 150R1 ("T150R1") is a polymer formed by the reaction of 1,2-ethanediamine with propylene oxide and ethylene oxide. Polymers of this latter type are generally referred to herein as a "polymeric oxyalkylated ethanediamine." An example of a suitable polymeric polyester/polyamine condensate is commercially available under the tradename Solsperse® 28000 from Zeneca, Inc., Wilmington, Del.

Alternatively, amine groups may be linked to the polymer as an amine salt of a carboxylic acid group. Examples of such amine salt-containing dispersants include alkylol ammonium salts of acidic polyesters (e.g., Disperbyk®-180; available from BYK-Chemie, USA, Wallingford, Conn.); salts of unsaturated polyamine amides and higher molecular weight acidic esters such a Antiterra® U80 (BYK Chemie, USA). Another type of dispersant which may be used in the present composition are partial amides of higher molecular weight unsaturated polycarboxylic acids, such as Disperplast® I (available from BYK-Chemie, USA).

Fluorinated anionic dispersants are another class of hyperdispersants which are particularly effective for use in the present compositions. Examples of suitable fluorinated anionic dispersants include salts of fluorinated alkyl phosphate partial esters, fluorinated alkylsulfonic acid salts and fluorinated alkylcarboxylic acid salts.

Typically, the present compositions include about 0.005 to about 5.0 wt. % and, preferably, about 0.01 to about 3.0 wt. % dispersant. When the composition includes a relatively high solids (e.g., at least about 55 wt. %) and PVDF (e.g., at least about 35 wt. %) loading, from about 0.5 to about 3.0 wt. % of the dispersant is typically employed. Where the composition is a clear coating having a total solids content of about 35–45 wt. % and a PVDF content of about 30–40 wt. %, lower levels of the dispersant (e.g. 0.01–0.2 wt. %) are generally employed.

In designing a particular formulation, the dispersant and solvent system are typically chosen to complement each other. Amine-based polymeric dispersants such as Solsperse® 28000 and Tetronic® 150R1 are particularly effective in formulations where the predominant solvent component is an ester or mixture of esters. Specific examples of such formulations include PVDF dispersions in TXIB, butyl carbitol acetate and/or propyleneglycol monomethyl ether acetate which include Solsperse® 20000, Solsperse® 28000, or Tetronic® 150R1.

Where the coating composition is based on a ketone solvent, such as isophorone, fluorinated anionic surfactants can be particularly effective as hyperdispersants. (e.g., such as Zonyl FSP (available from Dupont). Suitable examples include polyfluorosulfonic acid salts (e.g., Forafac® 1176 available from Elf Atochem)). Suitable fluorinated alkylsulfonic acid salt hyperdispersants typically include a sulfonic acid salt having a formula:

$$C_nF_{(2n+1)}-C_2H_4-SO_3^-M^+$$

wherein n is an integer from 4 to 10, and $M^+$ is $K^+$, $Na^+$, or $NH_4^+$. Specific examples of suitable fluorinated alkylsulfonic acid salt hyperdispersants include $C_6F_{13}-C_2H_4-SO_3^-K^+$ and $C_8F_{17}-C_2H_4-SO_3^-K^+$.

Fluorinated alkylcarboxylic acid salts are another class of fluorinated anionic surfactants suitable for use in the present coating compositions. Examples of suitable fluorinated alkylcarboxylic acid salts include carboxylic acid salts having the formula:

$$C_nF_{(2n+1)}-CO_2^-M^+$$

wherein n is an integer from about 4 to 10, and $M^+$ is $K^+$, $Na^+$, or $NH_4^+$. One specific example of a suitable fluorinated alkylcarboxylic acid salt is $C_6F_{13}-CO_2^-NH_4^+$. Fluorad® FC-129 is an example of a commercially available fluorinated alkylcarboxylic acid salt (available from 3M) which may be employed in the present compositions.

In order to improve the hardness and adhesion of the resulting cured film, the present compositions may include a hydroxy functional polymer, e.g., a hydroxy acrylic polymer. Those coating compositions which contain the hydroxy functional polymer typically include a curing agent, such as an aminoplast resin, as well.

The hydroxy functional polymer is subject to wide variation and is typically a solvent-soluble copolymer of monoethylenic monomers containing from about 1 wt. % to about 25 wt. % of a hydroxy functional monomer. The hydroxy functionality is generally the only reactive group in the copolymer, although a small amount of carboxylic acid functionality is permissible, though not essential. Preferably the hydroxy monomer content is from 2 to 10 wt. % of the monomer mixture.

Various hydroxy functional monomers can be used, but it is preferred to use an hydroxyalkyl ester of a monocarboxylic acid, such as acrylic acid or methacrylic acid. The alkyl groups contemplated are primarily those containing from 1–4 carbon atoms and illustrated by methyl ethyl, propyl or butyl, however esters of alcohols having up to 12 carbons may be also used. Preferred hydroxy functional monomers include 2-hydroxyethyl acrylate or 2-hydroxyethyl methacrylate. Hydroxy alkyl ethers, such as the hydroxyethyl ether of alkyl alcohol, are also useful.

The hydroxy functional copolymer may be produced by free-radical polymerization of a mixture of monoethylenically unsaturated monomers including the required proportion of a hydroxyalkyl acrylate or methacrylate. The other monomers are preferably acrylic and methacrylic esters of alcohols containing from 1 to 6 carbon atoms and preferably 1 or 2 carbon atoms. Most preferably, the non-hydroxylic monomers include at least about 50% methyl methacrylate, n-butyl methacrylate and/or ethyl acrylate. Small amounts, e.g., about 1–2 wt. %, of a carboxylic acid, like acrylic acid or methacrylic acid, may also be included in the monomer mixture. The hydroxy copolymer is preferably used in an amount of from about 1 to about 15 wt. % and more preferably from about 2 to about 10 wt. % of the composition.

An aminoplast resin is typically added to the composition in a sufficient amount to cure the hydroxy functional polymer. The weight ratio of the hydroxy functional polymer to the aminoplast resin is typically about 2:1 to about 10:1 and preferably, about 3:1 to about 6:1. Aminoplast resins are based on the addition products of an aldehyde (preferably formaldehyde), with an amino- or amido-group carrying substance. Examples of suitable aminoplast resins include condensation products obtained from the reaction of alcohols and formaldehyde with melamine, urea or benzoguanamine. These condensation products can be monomeric or polymeric. Condensation products of other amines and amides can also be employed, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is most often formaldehyde, other similar condensation products can be made from other aldehydes, such as acetaldehyde, crotonaldehyde, acrolein, benzaldehyde, furfural, glyoxal and the like.

The preferred aminoplast curing agent is simply a formaldehyde condensate with an amine, preferably melamine, to provide a heat-hardening methylol-functional resin. While many aminoplast resins are broadly useful, such as urea formaldehyde condensates and benzoguanamine formaldehyde condensates, it is preferred that the aminoplast resin be a polyalkoxymethyl melamine resin in which the alkoxy group contains from 1–4 carbon atoms. Appropriate melamine-formaldehyde condensates are readily available in commerce and are usually etherified with lower alcohols for use in organic solvent solution, as is well known. Examples of suitable aminoplast curing agents include an etherified melamine-formaldehyde condensate as solutions in organic solvent (e.g., a polymethoxymethyl melamine such as Cymel 303, available from Cytec). The aminoplast resin is typically present as from 0.1 to 10 wt. % of total resin solids, and, preferably, in an amount of from 0.2 to 3.0 wt. % of total resin solids.

While aminoplast resins are preferred for curing the hydroxy functional copolymer, it is also possible to use any curing agent reactive with hydroxy functionality, such as phenoplast resins or blocked polyisocyanates. Suitable blocked isocyanate curing agents include isophorone diisocyanate blocked with methyl ethyl ketoxime or octyl alcohol-blocked 2,4-toluene diisocyanate. The class of blocked isocyanate curing agents is well known, and these agents are well known to effect cure by forming urethane groups with the hydroxy functionality on the coating composition when baking causes the blocked isocyanate groups to dissociate and become active.

When the present compositions are to be used to form a clear coating, the formulation typically includes a thermoplastic resin, such as a thermoplastic acrylic polymer. The thermoplastic acrylic resins typically are the polymerized ester derivatives of acrylic acid and methacrylic acid. The esters are formed by the reaction of the acrylic of methacrylic acid with suitable alcohols, for example, methyl alcohol, ethyl alcohol, propyl alcohol, butyl alcohol and 2-ethylhexyl alcohol. Generally speaking the larger the alcohol portion of the ester, the softer and more flexible the resultant resin. Methacrylic esters tend to form harder films than the corresponding acrylic ester. Monomers, such as styrene, vinyl toluene, vinyl chloride, and vinylidene chloride can also be reacted with the acrylic and methacrylic esters so as to produce thermoplastic resins with excellent properties. An especially suitable resin is a copolymer of methyl methyacrylate and ethyl acrylate, having a molecular weight ($M_w$) of between about 50,000 and about 150,000.

The present compositions may be a clear (substantially lacking in color) where they are designed to be applied as a protective top coat. More commonly however, the coating compositions include a pigment. The pigment loading will depend on a number of factors including the desired opacity, color and chemical resistance. Typical, pigmented versions of the present composition include about 5 to about 25 and preferably about 10 to about 20 wt. % of one or more pigments.

Conventional additives including surfactants, antioxidants, ultraviolet light absorbers and stabilizers, rheology control agents, coalescing agents and the like may also be added to the present coating composition. For example, in order to prevent yellowing and/or deterioration during baking, the present coating compositions may include an antioxidant, such as Irgonox 1010 (available from Ciba-Geigy). A flatting agent, such as DeGussa product OK-412 or a silica (e.g., Syloid 7000 available from W. R. Grace) may be added to reduce the 60° gloss reading into the desired range. An additive such as a wax (e.g., Polymekon wax or Paxwax) or micronized PTFE may be added to improve surface lubricity and thus improve mar resistance.

The coating composition of the present invention may be prepared by conventional methods. For example, the coating composition may be prepared by blending the various components using a high speed disperser and milling equipment, such as a small media mill.

The present invention also provides a method of coating a metal substrate to provide a tough resilient film on at least one surface of the substrate. The method includes applying the above described fluorocarbon polymer-based coating composition onto the metal surface to form a vinylidene difluoride-based resin film and heating the coated substrate to form a cured film adhered to the substrate surface.

The coating composition may be applied to the substrate surface using a variety of well-known techniques. For example, the composition may be roll coated, bar coated or sprayed onto the surface. The metal surface is generally coated with a fluoropolymer- or acrylic-based primer coating, preferably a primer containing PVDF (such as a primer based on a blend of PVDF and a hydroxy functional acrylic copolymer) prior to the application of the present coating composition. A number of conventional flouropolymer- and acrylic-based primers are known to those skilled in the art. Examples of suitable primers which may be applied to a metal surface prior to the present compositions are disclosed in U.S. Pat. No. 4,684,677, the disclosure of which is herein incorporated by reference. Other suitable primers include those based on commercially available acrylic emulsions, such as AC-1822 (available from Rohm & Hass), UCAR® 452 and UCAR® 455 (available from Union Carbide Corp.), Joncryl® 537 (available from S. C. Johnson) and Sequabond® TR7830 (available from Sequa Chemicals, Chester, S.C.).

Where large rolls of thin gauge metal are to be coated, it is advantageous to apply the coating composition via a coil coating process, such as reverse roll coating. When the coating is carried out using such a process, the coated metal substrate is typically cured by heating for about 10 to about 50 seconds at a temperature of about 200° C. to about 300° C. If a spray coating process is used to apply the present composition, the resulting film is usually cured by heating for about 10 to about 15 minutes at a temperature of about 210° C. to about 270° C.

The present composition is generally suitable for use in coil coating and spray applications (e.g., at a total solids content of about 30 to about 70 wt. %). If desired, however, the composition may be thinned prior to being applied by the addition of a solvent. For spray applications additional solvent, such as xylene, toluene, methyl ethyl ketone or 2-butoxy ethanol, or the like, may be added to reduce the resin solids content of the composition. The viscosity desired will vary depending upon the spray equipment and atmospheric conditions. When applied via spray methods, pigmented versions of the present composition typically have a viscosity of 20–60 (#2 Zahn) and a total solids content of about 50 to about 70 wt. % (total resin solids of about 35 to about 50 wt. %). Clear versons of the present coating composition generally have a similar viscosity and contain a total resin solids content of about 30 to about 45 wt. %. Very often, the clear versions are thinned to some degree with an organic solvent prior to spray application (e.g., by the addition of 1 to 2 parts butyl carbitol per 10 parts of the clear coating composition).

The baking temperatures are not critical, but must be high enough to cause the fluoropolymer particles, e.g., PVDF particles, present in the dispersion to coalesce into a continuous film. A temperature of at least about 210° C. for about 10 minutes is generally adequate for this purpose. This temperature is more than sufficient to cure any hydroxy functional polymer present thereby providing enhanced solvent resistance and improved hardness. In coil coating processes, the oven dwell temperature is often no more than about 30 seconds and oven temperatures as high as 300° C. to 400° C. may be used. Vinylidene difluoride-based films are preferably cured by baking for a dwell time of about 0.25 to 1.0 minutes such that the metal substrate reaches a peak metal temperature of 225° C. to 260° C.

The present invention may be further described by reference to the following examples. Parts and percentages, unless otherwise designated, are parts and percentages by weight.

EXAMPLES

The following abbreviations and tradenames are used in the Tables:

TXIB—2,2,4-trimethyl-1,3-pentanediol diisobutyrate;
TEG-EH—triethylene glycol bis(2-ethylhexanoate);
PM Acetate—propyleneglycol monomethyl ether acetate;
DPM Acetate—dipropyleneglycol monomethyl ether acetate;
DMPhth—dimethyl phthalate;
BuCell—ethylene glycol monobutyl ether.
DBA—butyl carbitol acetate;
DB—butyl carbitol;
Isoph—isophorone;
Disperplast® I—partial amides of higher molecular weight unsaturated polycarboxylic acids (available from BYK-Chemie, USA);

Solsperse® 20000 ("S20")—an oxyalkylated amino alcohol (available from Zeneca, Inc., Wilmington, Del.);

Solsperse® 28000 ("S28")—a polymeric polyester/polyamine condensate (available from Zeneca, Inc., Wilmington, Del.);

Therm-Chek® 130—a mixture of barium and zinc salts available from Ferro Corp.;

T150R1—1,2-ethanediamine polymer (available from BASF as Tetronic® 701);

T701—oxyalkylated diamine (available from BASF as Tetronic® 150R1);

FC-129—potassium fluoroalkyl carboxylate (available from 3M as Fluorad® FC-129):

FSP—fluorinated phosphate ammonium salt (available from Dupont as Zonyl® FSP);

F1176—polyfluorosulfonic acid (available from Elf Atochem as Forafac® 1176);

Blocked PTSA—amine salt of p-toluenesulfonic acid;

PTFE—polytetrafluoroethylene;

Acrylic I—methyl methacrylate/butyl acrylate/hydroxyethyl acrylate/methacrylic acid copolymer (76:18:5:1) with an $M_w$ of 3,000 to 10,000;

Acrylic II—Acryloid® A21, thermoplastic methyl methacrylate/ethyl acrylate copolymer (available from Rohm & Haas, Philadelphia, Pa.);

Acrylic III—methyl methacrylate/butyl acrylate/hydroxyethyl acrylate/methacrylic acid copolymer (75:15.2:9:0.8) with an $M_w$ of 35,000 to 65,000; and Acrylic IV—methyl methacrylate/ethyl acrylate/hydroxyethyl acrylate copolymer (70:25:5) with an $M_w$ of 20,000 to 45,000.

Example 1

Coating Composition Preparation

A portion of the solvent and dispersant were combined under a mixer and agitated until the dispersant completely dissolved. The PVDF was then added under a high speed disperser and agitated under high speed for about 10 minutes. The mixture was then milled on a sand mill, small media mill, or other suitable milling equipment until a 5.5 minimum grind rating (Hegman scale) was obtained.

In a separate container, another portion of solvent and dispersant were combined as described above. The pigments were then added under a high speed disperser and agitated under high speed for about 10 minutes. This mixture was then milled on a sand mill, small media mill, or other suitable milling equipment until a 6.5 minimum grind reading (Hegman scale) was obtained.

The pigment dispersion was then added to the PVDF dispersion and the resulting mixture agitated under a high speed dispersion. Additional components of the formula (e.g., acrylic resin, melamine resin, blocked PTSA, micronized PTFE and/or solvent) were then added under agitation. Viscosity and color adjustments were made by the addition of solvent and/or shading paste as needed. The ratio of components present in a number of coating compositions of the present invention prepared by this procedure are shown in Tables I and II below.

Example 2

Film Generation and Properties

The coating compositions were applied to a primed aluminum or hot-dip galvanized metal substrate using either drawdown with a Bird bar or wire wound rod, or a spray application with a cup gun or other suitable spray device. The coated metal panel was then baked in a forced-draft oven. Metal substrates used for coil or slot application experiments were pretreated by coating the metal surface with Valspar Fluroprime™ 732X323 primer or Valspar LKW0066 to form a 0.1–0.4 mil thick primer coating. Metal substrates used for spray application experiments were pretreated by coating the metal surface with Valspar Fluroprime™ 733X310 primer to form a 0.2 mil thick primer coating.

Coating compositions A, B and C were applied to a primed metal substrate using a procedure which simulated slot coating. Coating compositions H, I and J were applied to a primed metal substrate using a procedure which simulated coil application. The panels were coated using a bird bar and then baked immediately in a 565° F. (296° C.) oven for about 30 seconds total oven dwell time to a peak metal temperature ("PMT") of about 480° F. (249° C.). After removal from the oven, the panel was rapidly cooled (quenched) in a bath of room temperature water and wiped dry.

Coating compositions D–G and K–M were applied to the primed metal substrate by spray application to form a wet PVDF film. The wet film was allowed to stand at room temperature for about 10 minutes and then placed in a 450° F. (232° C.) oven for about 12 minutes total oven dwell time. After removal from the oven, the panels were allowed to cool slowly to room temperature.

Table III shows the results of physical characterizations of films formed from compositions described in Example 1. The T-bend test results are reported as either 0T (single roll, no tape pick off) or 1T (double roll, no tape pick off). The cured films showed excellent solvent resistance, hardness and impact resistance.

Table IV shows a summary of the amounts of PVDF and total solids (NVM) in compositions A–M. The amount of PVDF present is listed both as a percentage of the total composition and as a percentage of the total polymeric components in the composition. The measured vicosities for a number of the coating compositions are also reported. The corresponding information for two commercial PVDF-based coating is included for comparison purposes. The commercial coil formula is a 70% Kynar® coating formulation sold by Valspar Corporation under the name Fluropon® Charcoal. The properties listed for the commercial spray formula are for a 70% Kynar® coating formulation sold by Valspar Corporation under the name Fluropon® Hartford Green which was thinned by adding 1 part xylene per 4 parts Fluropon®. The results demonstrate that the present invention allows the production of PVDF-based coatings formulations having substantially higher PVDF and/or total solids loadings than can presently be achieved with current commercial formulations. The present invention permits high PVDF and solids contents in pigmented formulations having a viscosity which allows application via coil or spray techniques without prior reduction ("thinning") with a volatile solvent such as xylene or butyl carbitol.

Example 3

Coil Coating Comparison

A comparison of a commercial PVDF-based (70% Kynar®) coil coating formulation and an exemplary composition (coating composition H) of the present invention was carried out using a laboratory test designed to simulate coil coating conditions. Samples (0.6–0.7 gm) of each coating composition were weighed into a 2.5 inch diameter aluminum weighing pans. The samples were diluted with about 2 ml of methylethyl ketone and spread uniformly using a paper clip. The aluminum pans were placed on a 0.012 inch thick aluminum sheet. The aluminum sheet was placed first in a forced draft oven at 104° C. (220° F.) for one minute and then in a forced draft oven at 329° C. (625° F.) for 30 seconds to achieve a peak metal temperature of 249° C. (480° C.). The samples were cooled to room temperature (over about 3 minutes) and the baked aluminum pans were reweighed. Triplicate determinations were made for each composition. The % NVM (non-volatile component by weight) was calculated for each sample from the weight loss which occurred during baking. The values reported below are based on the average for the three determinations. The results show that the measured % NVM (50.9 wt. %) for the commercial 70% Kynar® coil formulation was essentially the same as the theoretical % NVM shown in Table IV (52.9 wt. %). In other words, essentially all of the solvent component was volatilized out of the commercial 70% Kynar® coil formulation during the simulated coil baking conditions. In contrast, the % NVM measured for composition H (76.8 wt. %) after simulated coil baking conditions is substantially higher than the theoretical % NVM (62.4 wt. %) for this composition. This indicates that only a portion (circa 60%) of the 2,2,4-trimethyl-1,3-pentanediol diisobutyrate ("TXIB") solvent is lost during the baking of the PVDF-based coating. The remainder of the TXIB is retained in the baked coating and acts as a plasticizer.

Example 4

Clear Coating Composition Preparation

The solvent and dispersant were combined under a high speed disperser and agitated until the dispersant completely dissolved. The PVDF was then added under the high speed disperser and agitated under high speed for about 10 minutes. The mixture was then milled on a sand mill, small media mill, or other suitable milling equipment until a 5.5 minimum grind rating (Hegman scale) was obtained. Additional components of the formula (e.g., acrylic resin, silica) were then added under agitation. Viscosity adjustments were made by the addition of solvent as needed. The ratio of components present in three exemplary high PVDF clear coating compositions prepared by this procedure are shown in Table V below.

Example 5

Film Generation and Properties

Coating compositions N and Q were applied to a primed, color coated aluminum metal substrate via spray application with a cup gun or other suitable spray device. The coated metal panel was then baked in a forced-draft oven. The metal substrates were pretreated by coating the metal surface with a Valspar Fluroprime™ primer to form a 0.2 mil thick primer coating, coating the primed aluminum substrate with a PVDF-based color coat (Valspar Fluropon® Premier Red Coat) and baking in a forced draft oven at 232° C. for about 12 minutes.

Coating compositions N and Q were thinned by the addition of 1–2 parts butyl carbitol and/or xylenes per 10 parts coating composition and applied to the primed, color coated metal substrate by spray application to form a 1 to 2 mil thick wet PVDF-based film. The wet film was allowed to stand at room temperature for about 10 minutes and then placed in a 450° F. (232° C.) oven for about 12 minutes total oven dwell time. After removal from the oven, the panels were allowed to cool slowly to room temperature.

Table VI shows the results of physical characterizations of films formed from compositions N and Q. The film thicknesses listed are the total film thickness including the underlying primer and color coating. The cured films showed excellent solvent resistance, hardness and impact resistance. Table VII shows a summary of the amounts of PVDF and total solids (wt. % NVM) in compositions N and Q. The amount of PVDF present is listed both as a percentage of the total composition and as a percentage of the total polymeric components in the composition. The measured vicosities of the coating compositions are also reported. The results demonstrate that the present invention allows the production of clear PVDF-based coating formulations having substantially higher PVDF loadings than can presently be achieved with current commercial formulations. The present invention permits high PVDF content in clear top coat formulations having a viscosity which permits application via spray techniques with a limited amount of reduction (e.g., "thinning" via the addition of 0.5–3 parts of a solvent such as butyl carbitol and/or xylenes per 10 parts coating composition) with a volatile solvent.

Example 6

Examination of PVDF/Solvent/Dispersant Combinations

The viscosity properties of a number of PVDF/dispersant/solvent combinations were examined by measuring the Brookfield viscosities (at 10 and 100 rpm) for formulations containing a standardized amount of solvent and dispersant. The resin portion of the formulations consisted solely of PVDF (at either 40.5 wt. % or 50 wt. % PVDF).

The formulations were prepared by placing the indicated test solvent in a high speed disperser. The dispersant was weighed into the high speed disperser and the mixture was agitated until the dispersant completely dissolved in the solvent. The PVDF was added under high speed disperser agitation and the mixture was agitated for an additional 5–10 minutes. The viscosity of the formulation was then immediately measured on a Brookfield viscometer at 10 and 100 rpm.

Table VIII shows the viscosities of a number of combinations based on Standard Formula I (40.5 wt. % PVDF). Formula I contained 285 g of the test solvent, 2.9 g of the dispersant and 194 g PVDF. The results shown in Table VIII suggest that polymeric dispersants having one or more amino groups covalently bonded to the polymer (and specifically polymers in which at least one amino group is embedded in the polymer backbone) are particularly effective dispersants for ester-based formulations having resin components with very high PVDF contents (as high as 100 wt. % PVDF).

Table IX shows the viscosities of a number of combinations based on Standard Formula II (50 wt. % PVDF). Formula II contained 230 g isophorone, 2.3 g of the dispersant and 230 g PVDF. The results shown in Table IX suggest that fluorinated anionic dispersants and polymeric dispersants having one or more amino groups covalently bonded to the polymer are particularly effective dispersants for ketone-based formulations having resin components with very high PVDF contents (as high as 100 wt. % PVDF).

Example 7

Critical Surface Energies of Coated Panels

The critical surface energies were determined for an example of a clearcoat formulation of the present invention containing 90wt. % PVDF (on a resin solids basis) and a commercial PVDF clearcoat formulation containing 70 wt. % PVDF. The composition of the 90wt. % PVDF clearcoat formulation ("R") is shown in Table V. The composition of the commercial 70wt. % PVDF clearcoat formulation ("8-1") is shown in Table X. Metal panels with a coating formed from each of the two formulations were tested for advancing contact angle using five different liquids (benzyl alcohol, ethylene glycol, diiodomethane, formamide and water) on a Kruss Automated Goniometer A10. The critical surface energy of each panel was determined by the Zisman method for each of the panels. The panel coated with the commercial 70 wt. % PVDF formulation had a critical surface energy of 35.3 mN/m (dynes/cm). The panel coated with the 90 wt. % PVDF formulation had a critical surface energy of 32.3 mN/m. Lower surface energies have been related to desirable coating characteristics such as reduced dirt collection and graffitti resistance.

The raw contact angles varied by no more than 2° in each 3 drop analysis of a single panel, suggesting that the panel surfaces were fairly homogeneously coated. With the exception of the results obtained with water, the two panels differed significantly from each other. The 3 nM/m difference in critical surface energy was supported by the results with the other four liquids studied.

Example 8

Compositions of Coating Formulation

Table X below lists the components of three coating compositions. Compositions 8-2 and 8-3 are exemplary coatings according to the present invention. Composition 8-1 is an example of a commercial 70 wt. % PVDF coating compositions provided for comparison purposes.

The composition 8-2 is a white ($TiO_2$-based) pigmented PVDF based coating which includes about 71 wt. % PVDF (on a resin solids basis) together with two hydroxy functional acrylic polymers. As noted elsewhere herein, the dispersant in this formulation (Solsperse® 20000) is particularly effective in light colored and clear formulations because it imparts excellent viscosity properties to the formulation without substantially increasing the propensity of the coating to yellow.

Coating composition 8-3 contains 100 wt. % PVDF on a resin solids basis at a high overall PVDF loading (48.5 wt. %). The formulation is a dark bronze, pigmented, high PVDF content coating containing a polyester/polyamine dispersant (Solsperse® 28000). This formulation is notable for both the high percentage of PVDF on a resin solids basis (100%) and the high total PVDF loading (48.5 wt. %).

TABLE I

PVDF-BASED COATING COMPOSITIONS

| COMPONENT | A | B | D | E | F | G | H | K |
|---|---|---|---|---|---|---|---|---|
| Solvent | | | | | | | | |
| TXIB | 34.5 | 34.0 | 37.5 | 37.7 | 38.8 | 30.5 | 37.6 | 32.7 |
| PM Acetate | 1.5 | 1.5 | — | — | 1.8 | 4.0 | — | — |
| Xylene | — | — | — | — | — | — | — | 1.8 |
| Dispersant | | | | | | | | |

TABLE I-continued

PVDF-BASED COATING COMPOSITIONS

| COMPONENT | A | B | D | E | F | G | H | K |
|---|---|---|---|---|---|---|---|---|
| Disperplast I | 0.2 | 0.2 | — | — | — | — | — | — |
| Thermchek 130 | 1.6 | 2.9 | — | — | — | — | — | — |
| Solsperse ® 28000 | — | — | 1.0 | 1.0 | 1.0 | 1.1 | 1.2 | — |
| PVDF | 42.1 | 41.5 | 43.1 | 43.0 | 36.0 | 35.3 | 41.1 | 40.3 |
| Acrylic I | 2.7 | 2.7 | — | — | 3.2 | 7.1 | — | 3.7 |
| Melamine | | | | | | | | |
| Cymel 303 | 0.5 | 0.5 | — | — | 0.8 | 1.7 | — | — |
| Cymel 380 | — | — | — | — | — | — | — | 1.1 |
| Blocked PTSA | 0.04 | 0.04 | — | — | 0.02 | 0.02 | — | — |
| $TiO_2$ | 1.5 | 16.6 | 1.6 | 18.3 | 0.07 | 0.08 | 1.6 | 1.5 |
| Yellow Iron Oxide | 2.7 | — | 2.9 | — | — | — | 2.8 | 2.7 |
| Ceramic Black | 12.0 | — | 13.1 | — | 5.7 | 6.3 | 12.4 | 12.2 |
| Red Iron Oxide | 0.7 | — | 0.8 | — | — | — | 0.7 | 0.7 |
| Ceramic Blue | — | — | — | — | 6.0 | 6.6 | — | — |
| Chrome Oxide Green | — | — | — | — | 6.6 | 7.3 | — | — |
| Micronized PTFE | — | — | — | — | — | — | 2.7 | — |

TABLE II

PVDF-BASED COATING COMPOSITIONS

| COMPONENT | C | I | J | L | M |
|---|---|---|---|---|---|
| Solvent | | | | | |
| TXIB | 4.5 | 8.1 | 8.0 | 4.0 | 4.0 |
| TEG-EH | 26.8 | — | — | — | — |
| Isoph | — | 27.8 | 27.6 | — | — |
| PM Acetate | — | — | — | 2.1 | 30.8 |
| DPM Acetate | — | — | — | 28.7 | — |
| Xylene | — | — | — | 1.8 | 1.8 |
| Dispersant | | | | | |
| Solsperse ® 28000 | 0.9 | — | — | 1.2 | 1.2 |
| Disperplast I | — | 0.2 | 0.2 | — | — |
| Thermchek 130 | — | 0.2 | 0.6 | — | — |
| Vinyl Acrylic | — | 0.8 | 0.8 | — | — |
| PVDF | 47.0 | 44.9 | 44.7 | 40.3 | 40.3 |
| Acrylic I | — | — | — | 3.7 | 3.7 |
| Melamine (Cymel 380) | — | — | — | 1.1 | 1.1 |
| Blocked PTSA | — | 0.04 | 0.04 | — | — |
| $TiO_2$ | 1.7 | 1.6 | 17.9 | 1.5 | 1.5 |
| Yellow Iron Oxide | 3.0 | 2.8 | — | 2.7 | 2.7 |
| Ceramic Black | 13.7 | 12.8 | — | 12.2 | 12.2 |
| Red Iron Oxide | 0.8 | 0.8 | — | 0.7 | 0.7 |
| Micronized PTFE | 1.4 | — | — | — | - |

TABLE III

CURED FILM PROPERTIES

| COMPOSITION | TOTAL DFT (mils) | APPLICATION METHOD | 60° GLOSS | MEK DBL. RUBS | PENCIL HARDNESS | T-BEND |
|---|---|---|---|---|---|---|
| A | 2.0 | Slot  | 35 | >150 | B    | 0T |
| B | 2.0 | Slot  | 37 | >150 | B-HB | 0T |
| C | 5.0 | Slot  | 37 | >150 | <B   | —  |
| D | 1.0 | Spray | 32 | >150 | HB-F | 0T |
| E | 1.4 | Spray | 32 | >150 | HB-F | 0T |
| F | 1.3 | Spray | 25 | >150 | F    | 1T |
| G | 1.7 | Spray | 34 | >150 | F    | 1T |
| H | 2.0 | Coil  | 20 | >150 | B    | OT |
| I | 1.1 | Coil  | 20 | >150 | HB   | OT |
| J | 1.1 | Coil  | 24 | >150 | B-HB | OT |
| K | 1.2 | Spray | 28 | >150 | F    | OT |
| L | 1.2 | Spray | 28 | —    | —    | —  |
| M | 1.2 | Spray | —  | —    | —    | —  |

TABLE IV

Coating Compositions Solids/Viscosity

| COMPOSITION | Theoretical % NVM** | WT. % PVDF (TOTAL COMP.) | WT. % PVDF (TOTAL POLYMER) | VISCOSITY (#4 FORD) | VISCOSITY (#2 ZAHN) |
|---|---|---|---|---|---|
| A | 64.0 | 42.1 | 92.9  | —  | —  |
| B | 64.5 | 41.5 | 92.8  | —  | —  |
| C | 68.7 | 47.0 | 100.0 | —  | —  |
| D | 62.5 | 43.1 | 100.0 | 41 | —  |
| E | 62.3 | 43.0 | 100.0 | 70 | —  |
| F | 59.4 | 36.0 | 90.0  | 79 | —  |
| G | 65.5 | 35.3 | 80.0  | —  | 59 |
| H | 62.4 | 41.1 | 100.0 | 60 | —  |
| I | 64.1 | 44.9 | 100.0 | 36 | —  |
| J | 64.4 | 44.7 | 100.0 | 47 | —  |
| K | 63.2 | 40.3 | 89.8  | —  | 35 |
| L | 63.2 | 40.3 | 89.4  | —  | 35 |
| M | 63.2 | 40.3 | 89.4  | —  | 28 |
| Commercial Coil Formula | 52.9 | 26.6 | 70.0 | 89 | — |
| Commercial Spray Formula* | 37.8 | 18.7 | 70.0 | — | 35 |

*Fluropon ® Rartford Green reduced prior to spray application by addition of 0.25 parts xylene (per 1 part coating);
**NVM - theoretical wt. % non-volatile components.

TABLE V

High PVDF Clear Coating Compositions

| Component | N | Q | R |
|---|---|---|---|
| Solvent | | | |
| DMPhth | 22.1 | 20.6 | 22.5 |
| BuOH | 0.8 | 0.8 | 0.8 |
| BuCell | 6.9 | 7.1 | 7.0 |
| PM Actetate | 14.4 | 13.1 | 12.6 |
| Toluene | 18.7 | 20.1 | 19.1 |
| Dispersant | | | |
| Solsperse ® 20000 | 0.042 | 0.043 | 0.04 |
| PVDF | 33.5* | 34.3** | 34.2*** |
| Acrylic II | 3.5 | 3.6 | 3.6 |
| Silica | 0.05 | 0.3 | 0.1 |

*Kynar 500 Plus (Elf Atochem);
**Hylar MP-20 (Ausimont);
***Kynar 500 (Elf Atochem).

TABLE VI

Clear Coat Cured Film Properties

|  | N | Q |
|---|---|---|
| Total DFT (mils) | 1.6 | 1.6 |
| 60° Gloss | 30 | 40 |
| MEK DBL. RUBS | >150 | >150 |
| Pencil Hardness | H | H |
| T-Bend | OT | OT |
| Rev. Impact | 15 in-lb. | 20 in-lb. |

TABLE VII

Clear Coating Compositions Solids/Viscosity

|  | N | Q |
|---|---|---|
| Theoretical Wt. % NVM | 37.0 | 38.2 |
| Wt. % PVDF (Total Composition) | 33.5 | 34.3 |
| Wt. % PVDF (Total Polymer) | 90.5 | 90.5 |
| Visocity (Stormer) | 73 KU | 74 KU |

TABLE VIII

Viscosities of PVDF/Solvent/Dispersant Combinations

| Solvent/Dispersant | Brookfield 10 RPM | Brookfield 100 RPM | Thixotropic Index |
|---|---|---|---|
| TX1B/— | 13,260 | 1,910 | 6.9 |
| TX1B/S28 | 190 | 100 | 1.9 |
| TX1B/S20 | 3,160 | 630 | 5.0 |
| TX1B/T701 | 15,110 | 3,846 | 3.9 |
| TX1B/T150R1 | 360 | 146 | 2.5 |
| TX1B/FC-129 | 10,400 | 1,466 | 7.1 |
| TX1B/FSP | 11,100 | 1,550 | 7.2 |

TABLE VIII-continued

Viscosities of PVDF/Solvent/Dispersant Combinations

| Solvent/Dispersant | Brookfield 10 RPM | Brookfield 100 RPM | Thixotropic Index |
|---|---|---|---|
| (insoluble) | | | |
| Tx1B/F1176 | insoluble | | |
| DBA/— | 1,150 | 270 | 4.3 |
| DBA/S28 | 340 | 84 | 4.0 |
| DBA/S20 | 900 | 198 | 4.5 |
| DBA/FSP | 8,500 | 1,220 | 7 |
| DB/S28 | 2,000 | 388 | 5.2 |

TABLE IX

Viscosities of PVDF/Solvent/Dispersant Combinations

| Solvent/Dispersant | Brookfield 10 RPM | Brookfield 100 RPM | Thixotropic Index |
|---|---|---|---|
| Isoph/— | 4,520 | 700 | 6.5 |
| Isoph/S20 | 2,030 | 382 | 5.3 |
| Isoph/S28 | 1,200 | 258 | 4.7 |
| Isoph/T701 | 2,250 | 414 | 5.4 |
| Isoph/T150R1 | 1,820 | 364 | 5 |
| Isoph/F1176 | 300 | 104 | 2.9 |
| Isoph/FC129 (part. soluble) | 3,380 | 530 | 6.4 |
| Isoph/FSP | 320 | 112 | 2.9 |

TABLE X

Coating Compositions

| Component | 8-1 | 8-2 | 8-3 |
|---|---|---|---|
| Solvent | | | |
| C8 Diol Diester | 0 | 7.0 | 28.9 |
| DMPhth | 17.6 | 0.0 | 0.0 |
| BuCell | 12.8 | 0.0 | 0.0 |
| PM Acetate | 13.5 | 25.4 | 0.0 |
| Toluene | 10.0 | 0.0 | 0.0 |
| DPM | 0 | 12.3 | 0.0 |
| Butyl Acetate | 0 | 0.2 | 0.0 |
| Xylene | 2.1 | 0 | 0.0 |
| Dispersant | | | |
| Solsperse 20000 | 0 | 0.15 | 0.00 |
| Solsperse 28000 | 0 | 0.00 | 1.13 |
| PVDF | 31.3 | 25.9 | 48.5 |
| Acrylic I | 0 | 4.2 | 0.0 |
| Acrylic III | 0 | 6.1 | 0.0 |
| Acrylic IV | 11.4 | 0.0 | 0.0 |
| Blocked Isocyanate | 0 | 0.6 | 0.0 |
| Melamine (Cymel 303LF) | 1.2 | 0.0 | 0.0 |
| Silica | 0 | 0.3 | 0.0 |
| PTFE | 0 | 0.0 | 2.9 |
| TiO$_2$ | 0 | 17.7 | 1.6 |
| Ceramic Black | 0 | 0.0 | 13.2 |
| Red Iron Oxide | 0 | 0.0 | 0.8 |
| Yellow Iron Oxide | 0 | 0.0 | 2.9 |
| Total Resin Solids | 42.7 | 36.2 | 48.5 |
| % PVDF (Resin Basis) | 71.3 | 70.4 | 100.0 |

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many other variations and modifications may be made while remaining within the spirit and scope of the invention.

What is claimed is:

1. A coating composition having a dispersed fluoropolymer resin, said composition comprising:
    i) at least about 30 wt. % on a total composition basis of vinylidene difluoride-based polymer;
    ii) organic solvent including non-aromatic ester, non-aromatic ketone or a mixture thereof; and
    iii) hyperdispersant including polymeric polyester/polyamine condensate, oxyalkylated amine, or a mixture thereof.

2. The coating composition of claim 1 comprising (i) at least about 35 wt. % polyvinylidene difluoride on a total composition basis; (ii) about 15 to about 25 wt. % inorganic pigment on a total composition basis; and
    wherein at least about 50 wt. % of the organic solvent has a boiling point between about 250° C. to about 300° C.

3. A composite material comprising a metal substrate having at least one surface which includes a fluoropolymer resin-based film formed by a process comprising:
    coating the at least one surface with the coating composition of claim 1 to form a coated metal substrate; and
    heating the coated metal substrate.

4. A coating composition having a dispersed fluoropolymer resin comprising:
    i) at least about 30 wt. % polyvinylidene difluoride on a total composition basis;
    ii) organic solvent which includes dimethyl phthalate, toluene, ethylene glycol monobutyl ether, propyleneglycol methyl ether acetate, or a mixture thereof;
    iii) hyperdispersant which includes oxyalkylated amino alcohol, polymeric oxyalkylated ethanediamine, or a mixture thereof; and
    iv) about 5 to about 15 wt. % thermoplastic acrylic polymer on a resin solids basis.

5. A coating composition having a dispersed fluoropolymer resin comprising:
    i) at least about 35 wt. % polyvinylidene difluoride on a total composition basis;
    ii) organic solvent which includes 2,2,4-trimethyl-1,3-pentanediol diisobutyrate, propyleneglycol methyl ether acetate, dipropyleneglycol methyl ether acetate, butyl carbitol acetate, or a mixture thereof; and
    iii) hyperdispersant which includes polymeric polyester/polyamine condensate, polymeric oxyalkylated ethanediamine, or a mixture thereof.

6. The coating composition of claim 1 comprising at least about 85 wt. % polyvinylidene difluoride on a resin solids basis.

7. The coating composition of claim 1 wherein the organic solvent includes non-aromatic ester.

8. The coating composition of claim 7 wherein the non-aromatic ester comprises an alkanediol diester having from 10 to 30 carbon atoms.

9. The coating composition of claim 7 wherein the non-aromatic ester includes 2,2,4-trimethyl-1,3-pentanediol diisobutyrate, dipropyleneglycol methyl ether acetate, butyl carbitol acetate or a mixture thereof.

10. The coating composition of claim 1 wherein the polymeric dispersant includes polymeric polyester/polyamine condensate.

11. The coating composition of claim 1 wherein the oxyalkylated amine includes oxyalkylated ethanediamine, oxyalkylated amino alcohol, or a mixture thereof.

12. The coating composition of claim 11 wherein the oxyalkylated ethanediamine includes polymer formed by the reaction of 1,2-ethanediamine with propylene oxide and ethylene oxide.

13. The coating composition of claim 1 comprising about 0.01 to about 3.0 wt. % of the hyperdispersant.

14. The coating composition of claim 1 comprising about 85 to about 95 wt. % polyvinylidene difluoride on a resin solids basis, and about 5 to about 15 wt. % acrylic polymer on a resin solids basis.

15. The coating composition of claim 14 wherein the acrylic polymer comprises thermoplastic acrylic polymer.

16. The coating composition of claim 1 comprising at least about 30 wt. % polyvinylidene difluoride on a total composition basis.

17. The coating composition of claim 1 comprising at least about 50 wt. % total solids.

18. The coating composition of claim 17 further comprising inorganic pigment; wherein the coating composition has a #2 Zahn viscosity of about 25 to about 60 seconds.

19. The coating composition of claim 17 having a #4 Ford cup viscosity at 25° C. of about 60 to about 120 seconds.

20. The coating composition of claim 1 including about 35 wt. % to about 50 wt. % of the vinylidene difluoride-based polymer and having a #4 Ford cup viscosity at 25° C. of about 80 to about 105 seconds.

21. The coating composition of claim 1 wherein the vinylidene difluoride-based polymer includes polyvinylidene difluoride having an $M_w$ of about 350,000 to about 450,000, a $M_w/M_n$ ratio of about 3.5 to about 5.0, and a melting point of about 150–170° C.

22. The coating composition of claim 1 further comprising hydroxy functional polymer and aminoplast resin.

23. A composite material comprising a metal substrate having at least one surface which includes a fluoropolymer resin-based film formed by a process comprising:

coating the at least one surface with the coating composition of claim 22 to form a coated metal substrate; and heating the coated metal substrate.

* * * * *